(12) United States Patent  (10) Patent No.: US 9,123,161 B2
Adair et al.  (45) Date of Patent: Sep. 1, 2015

(54) SYSTEM AND METHOD FOR SUMMARIZING DATA ON AN UNSTRUCTURED GRID

(75) Inventors: Neal L. Adair, Sugar Land, TX (US); Evan P. Child, Bountiful, UT (US); Timothy A. Chartrand, Spring, TX (US); Jose J. Sequeira, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 322 days.

(21) Appl. No.: 13/810,869

(22) PCT Filed: May 23, 2011

(86) PCT No.: PCT/US2011/037591
§ 371 (c)(1),
(2), (4) Date: Jan. 17, 2013

(87) PCT Pub. No.: WO2012/018428
PCT Pub. Date: Feb. 9, 2012

(65) Prior Publication Data
US 2013/0120379 A1  May 16, 2013

Related U.S. Application Data

(60) Provisional application No. 61/370,696, filed on Aug. 4, 2010.

(51) Int. Cl.
*G06T 17/05* (2011.01)
*G06T 19/00* (2011.01)
(Continued)

(52) U.S. Cl.
CPC ............... *G06T 17/05* (2013.01); *E21B 49/00* (2013.01); *G01V 99/005* (2013.01); *G06T 19/00* (2013.01); *G06T 2219/2021* (2013.01)

(58) Field of Classification Search
None
See application file for complete search history.

(56) References Cited

U.S. PATENT DOCUMENTS 6,035,255 A  3/2000  Murphy et al.
6,044,328 A  3/2000  Murphy et al.
(Continued)

FOREIGN PATENT DOCUMENTS

CA  2 312 381  6/1999
EP  1 230 566  2/2005
(Continued)

OTHER PUBLICATIONS

Frantes, T. et al. (2001), "Impact of Volume Intrepretation & Visualization Technologies on Upstream Business", Offshore Technology Conf.
(Continued)

*Primary Examiner* — Maurice L McDowell, Jr.
(74) *Attorney, Agent, or Firm* — ExxonMobil Upstream Research Company

(57) ABSTRACT

A system and method for summarizing data corresponding to properties of interest on an unstructured grid that includes active cells and inactive cells on an output surface. An exemplary method comprises identifying an aggregation direction through a region of interest of the unstructured grid and identifying at least one active cell along the aggregation direction. The exemplary method comprises assigning an aggregated value for the at least one property of interest to a face of the output surface on a line along the aggregation direction based at least in part on the data corresponding to the at least one property of interest for the at least one active cell. The exemplary method further comprises filling the at least one data hole by identifying at least one face associated with an inactive cell on the line along the aggregation direction and assigning it an aggregated value.

20 Claims, 10 Drawing Sheets

(51) Int. Cl.
*E21B 49/00* (2006.01)
*G01V 99/00* (2009.01)

(56) References Cited

U.S. PATENT DOCUMENTS

| | | | |
|---|---|---|---|
| 6,070,125 | A | 5/2000 | Murphy et al. |
| 6,078,869 | A | 6/2000 | Gunasekera |
| 6,106,561 | A | 8/2000 | Farmer |
| 6,128,577 | A | 10/2000 | Assa et al. |
| 6,236,994 | B1 | 5/2001 | Swartz et al. |
| 6,373,489 | B1 | 4/2002 | Lu et al. |
| 6,519,568 | B1 | 2/2003 | Harvey et al. |
| 6,574,566 | B2 | 6/2003 | Grismore et al. |
| 6,810,370 | B1 | 10/2004 | Watts, III |
| 6,826,483 | B1 | 11/2004 | Anderson et al. |
| 6,826,520 | B1 | 11/2004 | Khan et al. |
| 6,829,570 | B1 | 12/2004 | Thambynayagam et al. |
| 6,928,399 | B1 | 8/2005 | Watts, III et al. |
| 6,980,935 | B2 | 12/2005 | Lu et al. |
| 6,993,434 | B2 | 1/2006 | Cheng et al. |
| 7,031,842 | B1 | 4/2006 | Musat et al. |
| 7,133,041 | B2 | 11/2006 | Kaufman et al. |
| 7,158,131 | B2 | 1/2007 | Yamazaki et al. |
| 7,248,258 | B2 | 7/2007 | Acosta et al. |
| 7,281,213 | B2 | 10/2007 | Callegari |
| 7,337,067 | B2 | 2/2008 | Sanstrom |
| 7,437,358 | B2 | 10/2008 | Arrouye et al. |
| 7,451,066 | B2 | 11/2008 | Edwards et al. |
| 7,539,625 | B2 | 5/2009 | Klumpen et al. |
| 7,548,873 | B2 | 6/2009 | Veeningen et al. |
| 7,627,430 | B2 | 12/2009 | Hawtin |
| 7,725,302 | B2 | 5/2010 | Ayan et al. |
| 2004/0268338 | A1 | 12/2004 | Gurpinar et al. |
| 2005/0209912 | A1 | 9/2005 | Veeningen et al. |
| 2007/0011134 | A1 | 1/2007 | Langseth et al. |
| 2007/0199721 | A1 | 8/2007 | Givens et al. |
| 2007/0266082 | A1 | 11/2007 | McConnell et al. |
| 2007/0294034 | A1 | 12/2007 | Bratton et al. |
| 2008/0030497 | A1 | 2/2008 | Hu et al. |
| 2008/0088621 | A1 | 4/2008 | Grimaud et al. |
| 2008/0165185 | A1 | 7/2008 | Smith et al. |
| 2008/0165186 | A1 | 7/2008 | Lin |
| 2008/0289877 | A1 | 11/2008 | Nikolakis-Mouchas et al. |
| 2008/0297510 | A1 | 12/2008 | Callegari |
| 2008/0306803 | A1 | 12/2008 | Vaal et al. |
| 2009/0027380 | A1 | 1/2009 | Rajan et al. |
| 2009/0027385 | A1 | 1/2009 | Smith |
| 2009/0043507 | A1 | 2/2009 | Dommisse et al. |
| 2009/0089028 | A1 | 4/2009 | Sagert et al. |
| 2009/0103793 | A1 | 4/2009 | Borland et al. |
| 2009/0125362 | A1 | 5/2009 | Reid et al. |
| 2009/0222742 | A1 | 9/2009 | Pelton et al. |
| 2009/0229819 | A1 | 9/2009 | Repin et al. |
| 2009/0299709 | A1 | 12/2009 | Liu |
| 2009/0303233 | A1 | 12/2009 | Lin et al. |
| 2010/0053161 | A1 | 3/2010 | Chuter |
| 2010/0134498 | A1 | 6/2010 | Pirzadeh et al. |

FOREIGN PATENT DOCUMENTS

| | | |
|---|---|---|
| EP | 1 865 343 | 12/2007 |
| WO | WO 99/28767 | 6/1999 |
| WO | WO 2009/079088 | 6/2009 |

OTHER PUBLICATIONS

Hall, P. (1994), "Implicit Volume Rendering of Generalised Cylinders", Victoria University of Wellington, Dept. of Computer Science, Technical Report CS-TR-94/10.

Knoll, A. et al. (2007), "Interactive Ray Tracing of Arbitrary Implicits with SIMD Interval Arithemtic", IEE Symposium on Interactive Ray Tracing, pp. 11-18.

Luebke, D. (2008), "CUDA: Scalable Parallel Programming for High-Performance Scientific Computing", Biomedical Imaging: From Nano to Macro, 5th IEEE Int'l. Symposium, pp. 836-838.

SYSTEM AND METHOD FOR SUMMARIZING DATA ON AN UNSTRUCTURED GRID

CROSS-REFERENCE TO RELATED APPLICATION

This application is the National Stage entry under 35 U.S.C. 371 of PCT/US2011/037591, that published as WO 2012/018428 and was filed on 23 May 2011, which claims the benefit of U.S. Provisional Application No. 61/370,696, filed on 4 Aug. 2010, each of which is incorporated herein by reference, in its entirety, for all purposes.

FIELD

The present techniques relate to providing three-dimensional (3D) data and/or visualizations of data corresponding to physical objects and analysis thereof. In particular, an exemplary embodiment of the present techniques relates to providing property maps of data on an unstructured grid that includes inactive cells.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Three-dimensional (3D) model construction and visualization have been widely accepted by numerous disciplines as a mechanism for analyzing, communicating, and comprehending complex 3D datasets. Examples of structures that can be subjected to 3D analysis include the earth's subsurface, facility designs and the human body, to name just three examples.

The ability to easily interrogate and explore 3D models is one aspect of 3D visualization. Relevant models may contain both 3D volumetric objects and co-located 3D polygonal objects. Examples of volumetric objects include seismic volumes, MRI scans, reservoir simulation models, and geologic models. Interpreted horizons, faults and well trajectories are examples of polygonal objects. In some cases, it may be desirable to view the volumetric and polygonal objects concurrently to understand their geometric and property relations. If every cell of the 3D volumetric object is rendered fully opaque, other objects in the scene will of necessity be occluded, and so it becomes advantageous at times to summarize the properties assigned to such volumetric objects, using various aggregation techniques such as summing or averaging, onto cubes, spheres, or surfaces so that other objects may be seen. These 3D model interrogation and exploration tasks are important during exploration, development and production phases in the oil and gas industry. Similar needs exist in other industries.

3D volumetric objects may be divided into two basic categories: structured grids and unstructured grids. Those of ordinary skill in the art will appreciate that other types of grids may be defined on a spectrum between purely structured grids and purely unstructured grids. Both structured and unstructured grids may be rendered for a user to explore and understand the associated data. There are large numbers of known volume summarization techniques for structured grids.

One known way to view and interrogate a 3D volume is to render summarized volumetric properties on a surface using summation or averaging methods, commonly called a property or attribute map. The map may be rendered on an arbitrary surface. In the case of a structured grid, such as seismic or a medical scan, the user can create an average property map along one of the primary directions: XY (inline or axial), XZ (cross-line or coronal) and YZ (time slice or sagital). Alternatively, a map can be created on any surface, horizon, or layer within the 3D volume. The organization of the grid, in many instances, provides for easy indexing of individual grid cells and, therefore, provides for rapid map creation. A typical benefit of maps created on similar surfaces is the ability to quickly compare summary information between multiple models possessing either similar or widely different gridding styles.

Some 3D visualization techniques are suitable for grid structures that fall between fully structured grids and fully unstructured grids. One such visualization technique relates to the use of reservoir simulation grids based on geologic models.

A geologic model may be thought of as an intermediate step between completely structured and completely unstructured grids. In its simplest form, a geologic model may comprise a structured grid with deformed geometry. In a geologic model, cells may be uniquely addressable, but their geometries are not entirely implicit. Because of deformation, corner vertices of a cell cannot be calculated from just the grid origin and unit vectors along with the cell's indices. However, each cell does comprise a polyhedron with six faces. An index may be used to find its neighbors. Each cell (except the boundary faces) shares six faces with other cells, and shares eight corners with other cells. Neighboring cells sharing a vertex may also be addressed. Those of ordinary skill in the art will appreciate that there may be variations on this basic definition of a geologic model. For example, a geologic model may comprise keyed out cells, faults and pinch out cells. However, the basic indices still apply and the majority of cells comprise six-faced polyhedrons. In addition, reservoir simulation grids that are based on geologic models may retain (i, j, k) cell indices, while explicitly storing cell geometries.

When attempting to produce a property map on an unstructured grid having inactive cells, the resulting display can be adversely impacted by the presence of inactive cells at the top or bottom of models with non-vertical columns of cells. Significant occlusion or overlap of regions frequently occurs around these cells, for grids with curvature or that are deviated to faults, as a result of the vertical projection from multiple z-values and overlap of adjacent cells. Furthermore, maps created as a projection onto a flat surface don't represent the actual topology of the model.

U.S. Pat. No. 6,574,566 to Grismore, et al. relates to a method for recognizing and comparing features of attribute data expressed in a 3D data survey. The method involves: extracting, mapping, color coding and displaying 3D data for at least one attribute. The data is based on tomographic paths. The tomographic paths are defined within a subvolume of instantaneous attribute data having the shape of a sphere. This is accomplished by extracting the subvolume of attribute data having a desired shape, defining multiple tomographic paths extending from a point within the subvolume to its bounding surface, combining instantaneous attribute values encountered along each of the tomographic paths to determine multiple aggregate values, mapping the thus determined aggregate attribute values on the surface of the sphere using a color code, and displaying the color coded sphere. The attribute maps are correlated with preexisting geological or stratigraphic templates to identify features.

U.S. Pat. No. 7,451,066 to Edwards, et al., describes a "near wellbore modeling" software that, when executed by a processor of a computer, will model a localized area of a reservoir field which surrounds and is located near a specific wellbore in the reservoir field. In a disclosed method, input data representative of a reservoir field containing a plurality of wellbores is received. A boundary around one specific wellbore is established in the reservoir field which will be individually modeled and simulated. A "fine scale" unstructured grid is imposed inside the boundary consisting of a plurality of tetrahedrally shaped grid cells and further impose a fine scale structured grid about the perforated sections of the specific wellbore. A plurality of fluxes/pressure values at the boundary is determined, the fluxes/pressure values representing characteristics of the reservoir field located outside the boundary. One or more properties are established for each tetrahedral cell of the unstructured grid and each cylindrical grid cell of the structured grid. A simulation is run using the fluxes/pressure values at the boundary to mimic the reservoir field outside the boundary and using the fine scale grid inside the boundary to thereby determine a plurality of simulation results corresponding respectively to the plurality of grid cells located inside the boundary the plurality of simulation results being representative of a set of characteristics of the reservoir field located inside the boundary. The plurality of simulation results which characterize the reservoir field located inside the boundary is displayed. By coarsening the grid inside the boundary, a structured grid outside the boundary is imposed. A simulation of the entire reservoir field may then be redone.

U.S. Pat. No. 6,106,561 to Farmer discloses a Flogrid Simulation Gridding Program that includes a Flogrid structured gridder. The structured gridder includes a structured areal gridder and a block gridder. The structured areal gridder may build an areal grid on an uppermost horizon of an earth formation by performing a disclosed method. The disclosed method comprises building a boundary enclosing one or more fault intersection lines on the horizon and building a triangulation that absorbs the boundary and the faults. A vector field is built on the triangulation. A web of control lines and additional lines is built inside the boundary. The web of control lines and additional lines have a direction that corresponds to the direction of the vector field on the triangulation thereby producing an areal grid. The areal grid is post-processed so that the control lines and additional lines are equispaced or smoothly distributed. The block gridder of the structured gridder drops coordinate lines down from the nodes of the areal grid to complete the construction of a three dimensional structured grid. A reservoir simulator receives the structured grid and generates a set of simulation results which are displayed on a 3D viewer for observation by a workstation operator.

U.S. Pat. No. 6,078,869 to Gunasekera describes a Petragrid method and apparatus that generates grid cell property information that is adapted for use by a computer simulation apparatus. A disclosed interpretation workstation includes at least two software programs stored therein: a first program called "Petragrid" and a second simulation program for generating a set of simulation results for display. The first Petragrid software program will receive well log and seismic data which indicates each layer of a formation grid, each layer of the formation where the grid is comprised of a plurality of cells. Accurate data associated with each grid cell, such as the transmissibility, is generated. Accurate data for each cell will be transmitted to the second simulation program which will respond by generating a set of more accurate simulation results for each cell of the grid and overlaying the more accurate simulation result for each cell onto each of the corresponding cells of the grid being displayed on the workstation display by the Petragrid software. The workstation will display each layer of the formation where each layer is gridded and each grid cell has its own color corresponding in numerical value to a more accurate simulation result (e.g. pressure or saturation) that corresponds to that cell.

U.S. Pat. No. 6,826,520 to Khan, et al., discloses a method for scaling up permeabilities associated with a fine-scale grid of cells representative of a porous medium to permeabilities associated with an unstructured coarse-scale grid of cells representative of the porous medium. An aerially unstructured Voronoi computational grid is generated using the coarse-scale grid as the genesis of the computational grid. The computational grid is then populated with permeabilities associated with the fine-scale grid. Flow equations are developed for the computational grid the flow equations are solved and inter-node fluxes and pressure gradients are then computed for the computational grid. These inter-node fluxes and pressure gradients are used to calculate inter-node average fluxes and average pressure gradients associated with the coarse-scale grid. The inter-node average fluxes and average pressure gradients associated with the coarse grid are then used to calculate upscaled permeabilities associated with the coarse-scale grid.

U.S. Patent Application Publication No. 2009/0303233 to Lin, et al. describes a system and method for probing geometrically irregular grids. The disclosure specifically relates to systems and methods for imaging a 3D volume of geometrically irregular grid data. Various types of probes and displays are used to render the geometrically irregular grid data, in real-time, and analyze the geometrically irregular grid data. The grids described require topologically regular i,j,k indexing. In this disclosed system, the 3D volume is defined as:

$$\text{cell} = f(I,J,K) = (v_1, v_2 \ldots v_8, a_1, a_2 \ldots a_n)$$

where $v_1, v_2 \ldots$ and $v_8$ are eight vertices for the cells and $a_n$ are attributes. This indexing is a requirement for the described probing technique, which significantly limits the types of data on which the described method can operate.

EP Patent Application Publication No. 1865343 to Gunning, et al., describes a method for estimating and/or reducing uncertainty in reservoir models of potential petroleum reservoirs. The method comprises receiving the results of a stochastic seismic inversion and transforming the inversion data into a form suitable for reservoir modeling and flow simulations while honoring inter-property and inter-layer correlations in the inversion data as well as measured well data and other geological constraints.

SUMMARY

An exemplary embodiment of the present techniques comprises a method for summarizing data corresponding to at least one property of interest on an unstructured grid that includes a plurality of active cells and a plurality of inactive cells on an output surface. An exemplary method comprises identifying an aggregation direction through a region of interest of the unstructured grid and identifying at least one active cell along the aggregation direction. Data corresponding to the at least one property of interest for the at least one active cell is summarized. An output surface is constructed based on model topologies represented by the unstructured grid or an intersection of a surface and the unstructured grid. The output surface is used to display data about the property of interest from the unstructured grid. The exemplary method comprises assigning an aggregated value for the at least one property of interest to a face of the output surface on a line along the aggregation direction based at least in part on the data corresponding to the at least one property of interest for the at least one active cell. The exemplary method additionally comprises identifying at least one data hole in the output surface where at least one aggregation has no corresponding face on the output surface, or where at least one output face is not assigned an aggregated value because it is not on the line along the aggregation direction. The exemplary method further comprises filling the at least one data hole by identifying at least one face associated with an inactive cell on the line along the aggregation direction and assigning it an aggregated value or by identifying at least one face on the output surface that is not assigned an aggregated value and assigning it an aggregated value corresponding to another face in the cell containing the at least one face that is not assigned an aggregated value.

In one exemplary method, a visualization of values for the property of interest is provided on the output surface. The output surface may comprise a contiguous map of the property of interest on the unstructured grid.

An inactive face in the aggregation direction may be a nearest neighbor to any face previously populated on the output surface. The inactive face may be at the same relative distance between two topological layers as the at least one active face along neighboring aggregations.

An output surface face may be selected. The output surface face may intersect the unstructured grid along the aggregation direction. Nodes may be created for each intersection of the output surface face and the unstructured grid.

In one exemplary embodiment, identifying the at least one inactive cell comprises providing a line between two active cells along the aggregation direction and identifying whether the at least one inactive cell is intersected by the line. The aggregation direction may comprise along columns, normal to a surface or vertical.

An exemplary method may comprise selecting an aggregation method to apply to data corresponding to the property of interest. The aggregation method may comprise summing data values for cells along the aggregation direction or averaging data values for cells along the aggregation direction. One or more external geometric criterion may be selected to identify locations of output faces on the output surface. The summation or averaging methods may be weighted by a property. A map created according to an exemplary embodiment may be compared with another map by difference or ratio.

A computer system according to the present techniques is adapted to summarize data corresponding to a property of interest on an unstructured grid. The unstructured grid includes a plurality of active cells and a plurality of inactive cells. The computer system comprises a processor and a non-transitory, computer-readable storage medium that stores computer-readable instructions for execution by the processor. The computer-readable instructions comprise code that causes the processor to identify an aggregation direction through a region of interest of the unstructured grid. The computer-readable instructions also comprise code that causes the processor to identify at least one active cell along the aggregation direction. Additional computer-readable instructions may comprise code that causes the processor to summarize data corresponding to at least one property of interest for the at least one active cell. The computer-readable instructions may additionally comprise code that causes the processor to construct an output surface based on model topologies represented by the unstructured grid or an intersection of a surface and the unstructured grid. Further, the computer-readable instructions may comprise code that causes the processor to assign an aggregated value for the at least one property of interest to a face of the output surface on a line along the aggregation direction based at least in part on the data corresponding to the at least one property of interest for the at least one active cell. Yet additional computer-readable instructions may comprise code that causes the processor to identify at least one data hole in the output surface where at least one aggregation has no corresponding face on the output surface, or where at least one output face is not assigned an aggregated value because it is not on the line along the aggregation direction. Additional computer-readable instructions may comprise code that causes the processor to fill the at least one data hole by identifying at least one face associated with an inactive cell on the line along the aggregation direction and assigning it an aggregated value or by identifying at least one face on the output surface that is not assigned an aggregated value and assigning it an aggregated value corresponding to another face in the cell containing the at least one face that is not assigned an aggregated value.

In an exemplary computer system, computer-readable instructions comprise code that causes the processor to provide a visualization of values for the property of interest for the output surface. The output surface may comprise a contiguous map of the property of interest on the unstructured grid.

The inactive cell may be a nearest neighbor of the at least one active cell along the aggregation direction. In addition, the inactive cell may be at the same relative distance between two topological layers as the at least one active face along neighboring aggregations.

In one exemplary computer system, the computer-readable instructions comprise code that causes the processor to select an output surface face that intersects the unstructured grid along the aggregation direction.

One exemplary embodiment according to the present techniques relates to a method for producing hydrocarbons from an oil and/or gas field using data corresponding to a property of interest of the oil and/or gas field. An exemplary method comprises identifying an aggregation direction through a region of interest of an unstructured grid that embodies data corresponding to at least one property of interest. The unstructured grid may include a plurality of active cells and a plurality of inactive cells. At least one active cell along the aggregation direction may be identified. Data corresponding to the at least one property of interest may be summarized for the at least one active cell. The exemplary method of producing hydrocarbons may comprise constructing an output surface based on model topologies represented by the unstructured grid or an intersection of a surface and the unstructured grid. An aggregated value for the at least one property of interest may be assigned to a face of the output surface on a line along the aggregation direction based at least in part on the data corresponding to the property of interest for the at least one active cell. A data hole in the output surface may be identified where at least one aggregation has no corresponding face on the output surface because of the presence of an inactive cell. Alternatively, a data hole may be identified where at least one output face is not assigned an aggregated value because it is not on the line along the aggregation direction. A data hole resulting from in inactive cell may be filled by identifying at least one face associated with an inactive cell on the line along the aggregation direction and assigning it an aggregated value. A data hole identified because a face has no aggregated value assigned may be filled by identifying at least one face on the output surface that is not assigned an aggregated value and assigning it an aggregated value corresponding to another face in the cell containing the at least one face that is not assigned an aggregated value. The exemplary method for producing hydrocarbons may comprise producing a data map that comprises the values for the at least one property of interest on the output surface. Hydrocarbons are extracted from the oil and/or gas field using the data map.

DESCRIPTION OF THE DRAWINGS

Advantages of the present techniques may become apparent upon reviewing the following detailed description and drawings of non-limiting examples of embodiments in which.

DETAILED DESCRIPTION

Figure 1:
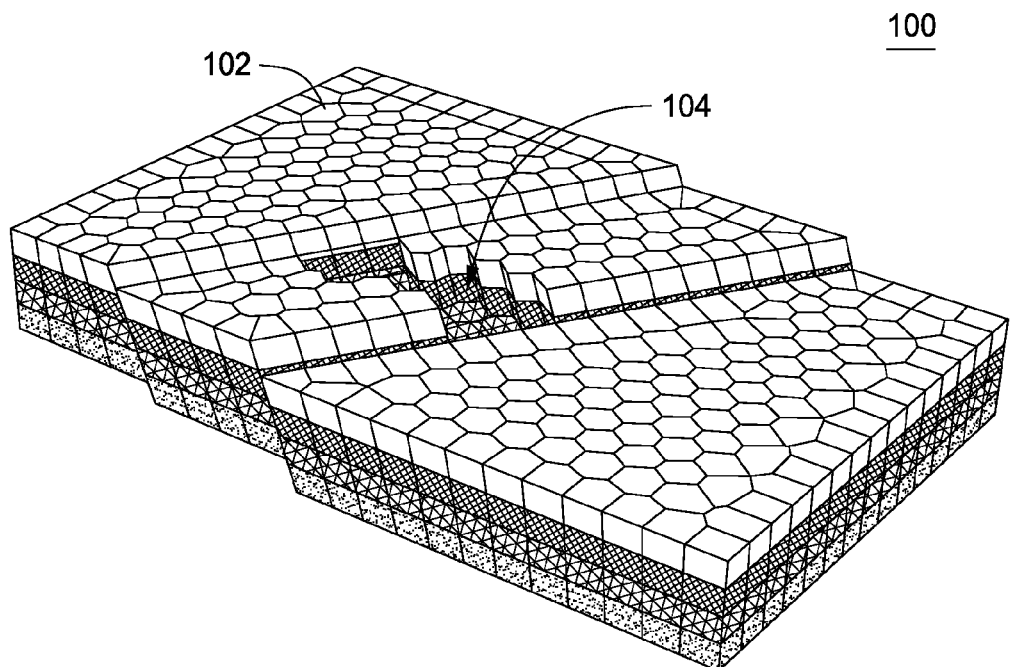
FIG. 1 is a diagram of a portion of an unstructured grid with keyed out cells.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "cell" refers to a collection of faces, or a collection of nodes that implicitly define faces, where the faces together form a closed volume.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

As used herein, the terms "computer-readable medium", "non-transitory, computer-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible, non-transitory storage medium or tangible distribution medium and prior art-recognized equivalents and successor media, in which the software implementations embodying the present techniques are stored.

As used herein, the term "face" refers to an arbitrary collection of points that form a surface.

As used herein, the term "fault" refers to a break in the earth layer and the adjacent horizon surfaces, across which there is observable displacement. A fault may either block the flow of hydrocarbons, creating a trap in which hydrocarbons may collect, or enhance the flow of hydrocarbons between regions in a reservoir.

As used herein, the term "geologic model" refers to a model that is topologically structured in i,j,k space but geometrically varied. A geologic model may be defined in terms of nodes and cells. Geologic models can also be defined via pillars (lines connecting the vertical edges of a column of cells). A geologic model may be visually rendered as a shell (i.e., a volume with data displayed only on outer surfaces).

As used herein, the term "i,j,k space" refers to a local horizontal reference frame for a geo-cellular model having specified integer coordinates for (i,j,k) for consecutive cells. By convention, k represents a vertical coordinate. i,j,k space may be used as a sample space in which each coordinate represents a single sample value without reference to a physical characteristic.

As used herein, the term "node" refers to a collection of points defining one topological location in i,j,k space. Unless a split or fault condition is associated with the node, nodes have only one point.

As used herein, the term "keyed out cell" refers to a cell whose properties are intentionally removed. The keyed out cell maintains its geometry, and therefore its volume, but no property information is stored. This results in the inability to uniquely identify the neighboring cells or faces of an inactive cell in an unstructured grid using properties alone. Cells are typically keyed out to reduce memory requirements and compute time required for flow simulations when they do not significantly contribute to flow.

As used herein, the term "pinch out cell" refers to a cell possessing two coplanar surfaces, such as the top and bottom faces. While the pinch out cell has no volume, the i,j,k location of the cell is maintained.

As used herein, the term "point" refers to an X,Y,Z location in 3D space.

As used herein, the term "polyline" refers to an ordering of points. A polyline may be displayed as connected line segments (or cylinders) and may or may not be closed. Properties of polylines may be used to provide color or varying the thickness of the polyline and may be discrete or interpolated between known points.

As used herein, the term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to a characteristic or stored information related to an object. Application of the appropriate definition is intuitive to one skilled in the art of computer science.

As used herein, the term "structured grid" refers to a matrix of volume data points known as voxels. Structured grids are typically used with seismic data volumes or medical imaging.

As used herein, the term "topological elements" refers to the building blocks of an object. Points, faces, or cells are the most common examples.

As used herein, the term "unstructured grid" refers to a collection of cells with arbitrary geometries. Each cell can have the shape of a prism, hexahedron, or other more complex 3D geometries. When compared to structured grids, unstructured grids can better represent actual data since unstructured grids can contain finer (i.e. smaller) cells in one area with sudden changes in value of a property, and coarser (i.e. larger) cells elsewhere where the value of the property changes more slowly. Finer cells may also be used in areas having more accurate measurements or data certainty (for example, in the vicinity of a well). The flexibility to define cell geometry allows the unstructured grid to represent physical properties better than structured grids. In addition, unstructured grid cells can also better resemble the actual geometries of subsurface layers because cell shape is not restricted to a cube and may be given any orientation. However, all cell geometries need to be stored explicitly, thus an unstructured grid may require a substantial amount of memory. Unstructured grids may be employed in connection with reservoir simulation models. Note that the term unstructured grid relates to how data is defined and does imply that the data itself has no structure. For example, one could represent a seismic model, typically represented by structured grids, as an unstructured grid with explicitly defined nodes and cells. The result would necessarily be more memory intensive and inefficient to process and visualize than the corresponding structured definition.

As used herein, the term "unstructured surface" refers to a collection of points and polygonal faces. Unstructured surfaces may be visually rendered as surfaces. Properties may be used to color the surface.

As used herein, the terms "visualization engine" or "VE" refer to a computer component that is adapted to present a model and/or visualization of data that represents one or more physical objects.

As used herein, the term "well" refers to a surface location with a collection of wellbores. Wells may be visually rendered as a point or a glyph, along with a name.

As used herein, the term "wellbore" refers to a constituent underground path of a well and associated collections of path dependent data. A wellbore may be visually rendered as a collection of connected line segments or curves. Wellbores may also be visually rendered cylindrically with a radius.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. These quantities may be stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "adjusting", "assigning", "comparing", "computing", "creating", "defining", "determining", "displaying", "extracting", "identifying", "limiting", "obtaining", "processing", "performing", "predicting", "producing", "providing", "selecting", "storing", "summarizing", "transforming", "updating" or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Exemplary embodiments of the present techniques may provide the ability to interrogate and explore 3D model data that are stored as unstructured grids. The results of this interrogation may be useful to both geoscientist and engineers in the oil and gas industry. Inactive regions within an unstructured grid, including cells that have been keyed out, may be filled according to an exemplary embodiment. In this manner, summary data representing active regions may be accurately displayed in a visualization relative to the location of inactive cells from the unstructured grid.

A system according to one exemplary embodiment may create a contiguous set of faces either inside or at the outer boundary of a reservoir model that shows the summary of the properties of the relevant region displayed on the specified output surface. Summary statistics could include the sum, average, weighted sum, or weighted average property values for a group of cells. The output surface could include any user specified model layer, the top or base of a specified zone, or any other surface coincident with the model. One exemplary embodiment may provide a tool for directly comparing maps from multiple sources, such as simulation and geologic models. The problem of providing a property map on an unstructured grid having inactive cells is explained below with reference to FIG. 1.

FIG. 1 is a diagram of a portion of an unstructured grid corresponding to a geologic model with keyed out cells. The diagram is generally referred to by the reference number 100. The diagram 100 shows an unstructured grid 102, which comprises a plurality of cells. Each of the plurality of cells of the unstructured grid 102 may represent data corresponding to one or more physical properties of interest for the region represented by the unstructured grid 102. An area 104 represents a portion of the unstructured grid 102 for which the cells are keyed out. Moreover, the keyed out cells do not have any data corresponding to the properties in that region. In models that contain cells acting as complete barriers to flow (for example, shale cells), those cells may be removed from consideration or "keyed out" when performing fluid flow analysis.

Figure 2:
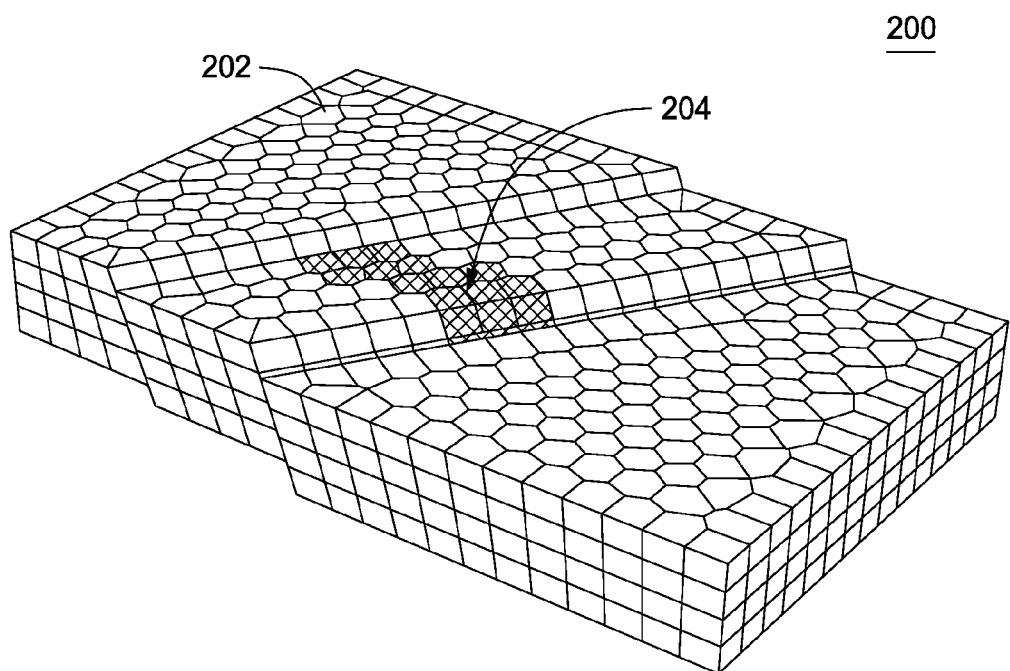
FIG. 2 is a diagram of a portion of an unstructured grid with keyed out cells shown as an inactive region.

FIG. 2 is a diagram of a portion of an unstructured grid with keyed out cells shown as an inactive region. The diagram is generally referred to by the reference number 200. The diagram 200 shows an unstructured grid 202, which comprises a plurality of cells. The unstructured grid 202 includes an inactive region 204, which comprises an area of the structured grid 202 corresponding to the area 104 of keyed out cells in FIG. 1.

Those of ordinary skill in the art will appreciate that, in an unstructured grid, summarizing a property of interest onto a surface that may include keyed out cells provides a unique set of challenges (as compared to maps of structured grids) in order to create and accurately display aggregated properties. Moreover, the cells of structured grids are uniquely identifiable in i,j,k space even though the cells are not populated with data. Unstructured grids typically are not able to be described by regular i,j,k indexing. Additionally, inactive cells are typically not populated with the appropriate properties to correctly identify their spatial location, making it difficult to create a meaningful summary map. Specifically, the data required to generate a contiguous output surface from the grid and place the relevant data on that surface in the appropriate location is not present in the inactive cells of unstructured grids. The difficulties in displaying average properties for unstructured grids are explained herein with reference to FIG. 3, FIG. 4 and FIG. 5.

Figure 3:
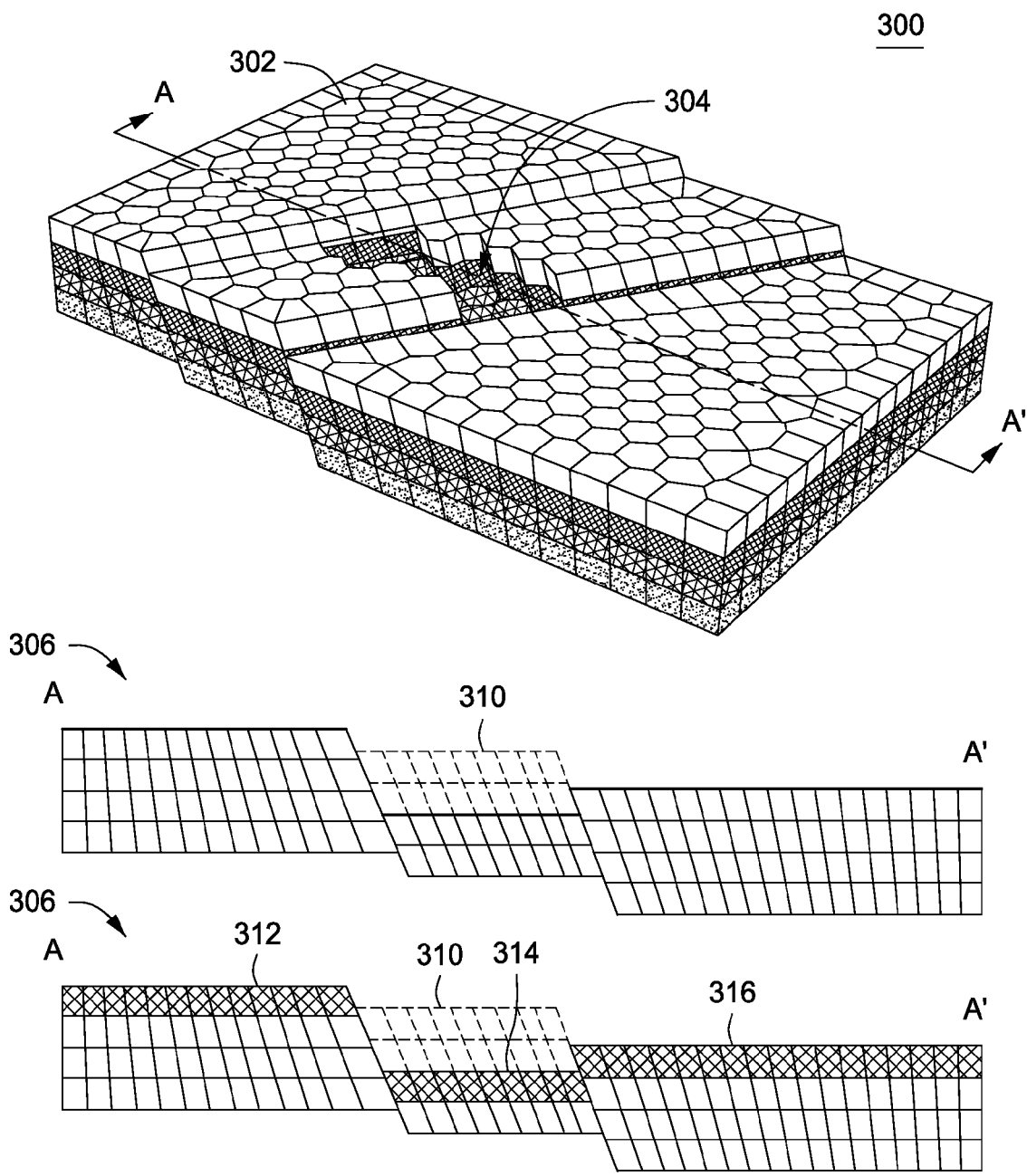
FIG. 3 is a diagram showing a region of an unstructured grid with depictions of average properties displayed on the top active face or cell.

FIG. 3 is a diagram showing a region of an unstructured grid with depictions of average properties displayed on the top active face or cell. The diagram is generally referred to by the reference number 300. The diagram 300 includes a portion of an unstructured grid 302 having an inactive region 304. The diagram 300 includes a first panel 306 and a second panel 308.

The first panel 306 shows a cross-section of the unstructured grid 302 taken along a line A-A'. Each cell of the unstructured grid shown in the cross-section is depicted as a separate square in the first panel 306. An inactive region 310 (shown with dashed lines in the first panel 306) corresponds to the inactive region 304 of the unstructured grid 302. The inactive region 310 has no data associated with the constituent cells.

The second panel 308 shows the cross-section of the unstructured grid 302 taken along the line A-A' with summary data added on the top active face. The summary data may comprise summed or averaged values, which may be displayed, for example, at the top or bottom active model face or cell. A data region 312 comprises summary data representing a first portion of the unstructured grid 302. As shown in FIG. 3, the data region 312 is properly displayed along the top of a corresponding region of the second panel 308. Similarly, a data region 316 comprising summary data representing another portion of the unstructured grid 302 is properly displayed along the top of a corresponding region of the second panel 308. A data region 314 corresponding to the inactive region 310, however, is not displayed along the top of the second panel 308. This is because the location of the cells that comprise the inactive region 310 is not determinable in the unstructured grid 302. Moreover, the inactive region 310 is at the top of the corresponding region of the second panel 308, but the summary data cannot be displayed there because the locations of the corresponding cells cannot be determined Therefore, the data region 314 is not displayed in the correct location relative to the data region 312 and the data region 316.

Figure 4:
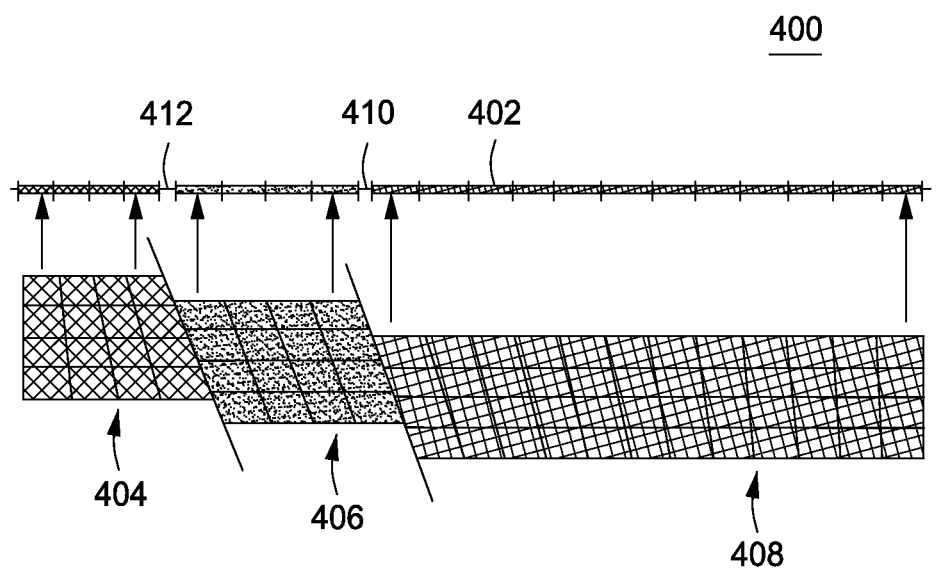
FIG. 4 is a diagram showing a display of average values of properties from an unstructured grid projected onto a surface.

FIG. 4 is a diagram showing a display of average values of properties from the top cells of a faulted unstructured grid projected onto a surface. The diagram is generally referred to by the reference number 400. The diagram 400 shows a cross-section of cells from an unstructured grid. Average values of properties represented by the cells are projected from the top cells of the unstructured grid onto a map surface 402. The cross-section includes a first region 404 of cells, a second region 406 of cells and a third region 408 of cells. Because the cells in the cross-section are displaced by faults, the projection of average values from the top cells onto the map surface 402 results in gaps 410, 412 for which no data values are shown.

Figure 5:
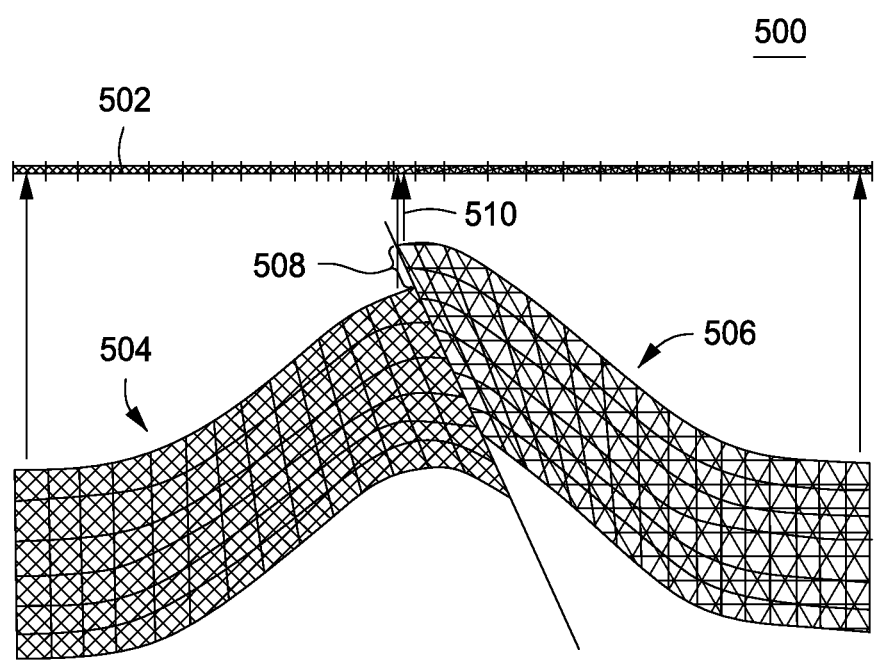
FIG. 5 is a diagram showing a display of average values of properties projected onto a surface using an interpolation method.

FIG. 5 is a diagram showing a display of average values of properties projected from the top cells onto a surface using an interpolation method. The diagram is generally referred to by the reference number 500. The diagram 500 shows a cross-section of cells from an unstructured grid. Average values of properties represented by the cells are projected from the top cells onto a map surface 502 using an interpolation technique such as kriging. The cross-section includes a first region 504 of cells and a second region 506 of cells. Because of the presence of a fault, the first region 504 of cells and the second region 506 of cells are disjointed with respect to each other (see arrow 508). As a result, the projection of interpolated values onto the map surface 502 does not accurately reflect the actual topology of the model represented by the corresponding unstructured grid (see arrow 510). In the presence of inactive cells in the top layer of cells, properties would need to be projected from the top active cell. The projections from active cells in lower layers would be disjoint with respect to the overlaying layers resulting in an inaccurate representation of the property distribution. Depending on the geometry of the unstructured grid, the dislocations resulting from the presence of inactive cells could take the form of either overlapping segments, similar to those represented by arrows 508 and 510, or by gaps similar to 410 and 412.

An exemplary embodiment addresses the deficiencies associated with the creation of summarized property maps for unstructured grids, and allows users to easily work with maps from multiple sources. Moreover, the present techniques relate to a software tool that provides users with the ability to create maps from unstructured grids, based on a set of predefined operations, and to generate comparisons with maps created from other structured or unstructured grids. Specific operations may include, but are not limited to: sum, weighted sum, average, and weighted average. Specific comparisons between multiple maps include, but are not limited to difference and ratio.

Figure 6:
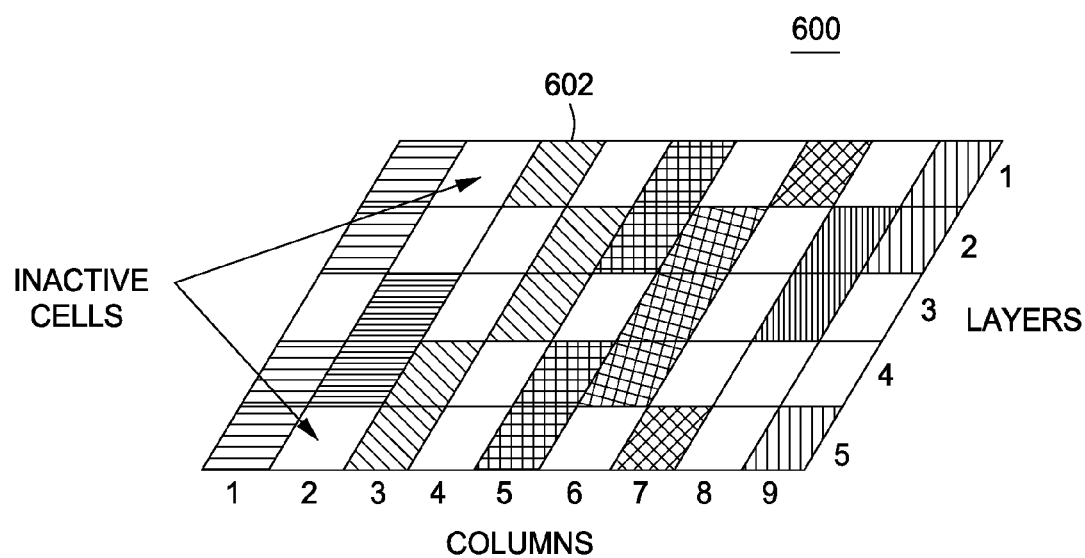
FIG. 6 is a diagram showing a region of an unstructured grid, including a plurality of inactive cells.

FIG. 6 is a diagram showing a region of an unstructured grid, including a plurality of inactive cells. The diagram is generally referred to by the reference number 600. The diagram 600 includes a portion of an unstructured grid 602 that comprises a plurality of cells. As shown, the unstructured grid 602 is arranged as a matrix of cells laid out in columns and layers. The cells with various shades of hatching include data corresponding to one or more physical properties. The empty cells (no hatching) are inactive.

Maps may be created by performing calculations on a set of related cells, such as a column, and painting the resulting value on a specified set of faces. The active cells of unstructured grids contain sufficient information to uniquely identify individual cells, such as a property representing the column and layer, as shown in FIG. 6.

The cells shown in the diagram 600 represent a slice through an unstructured grid painted with the column property. The column and layer information is not stored in inactive cells. Inactive cells are typically populated with a minimal set of properties including their total volume. However, most other properties may not be stored with inactive cells and their associated faces in effort to reduce memory usage and computational time for performing analysis, including those properties representing location of the cell or face in the unstructured grid 602.

Figure 7:
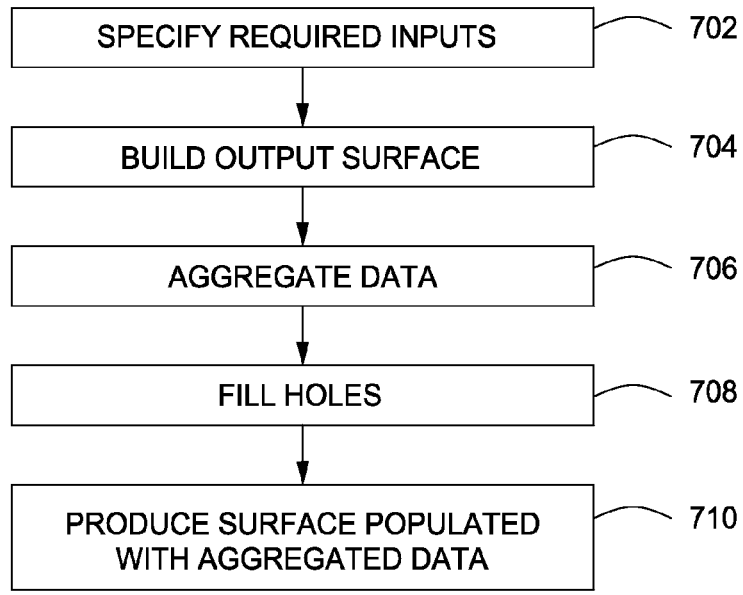
FIG. 7 is a process flow diagram showing a method for creating a contiguous map of properties from an unstructured grid having a plurality of inactive cells, in accordance with an exemplary embodiment of the present techniques.

FIG. 7 is a process flow diagram showing a method for creating a contiguous map of properties from an unstructured grid having a plurality of inactive cells, in accordance with an exemplary embodiment of the present techniques. The method is generally referred to by the reference number 700. As explained herein, exemplary embodiments of the method 700 may be used to create a contiguous map of properties from a model such as the unstructured grid 102. Moreover, the present techniques overcome the aforementioned problem that inactive cells in an unstructured grid do not store properties necessary to identify the location of the inactive cells.

At block 702, a user specifies required inputs. The specified inputs may include a model to analyse, an aggregation algorithm to be applied and/or a specified region of interest within an unstructured grid, to name just a few examples. An output surface is built, as shown at block 704.

Data is aggregated according to a specified algorithm for a specified region of interest, as shown at block 706. Examples of algorithms that may be used to aggregate data represented by an unstructured grid include aggregation of data by column, aggregation of data along a line projected through the unstructured grid, aggregation of data along a line normal to a cell face of the unstructured grid, or aggregation normal to a smoothed surface generated from a subset of cell nodes.

Those of ordinary skill in the art will appreciate that other algorithms may be developed depending on factors such as, for example, the characteristics of the unstructured grid being evaluated and the parameters of a specific analysis problem.

At block 708, holes in the data attributable to the presence of inactive cells are filled. Moreover, holes in the data may occur because there is no data associated with a specific property in the inactive cells of the corresponding unstructured grid. As explained herein, data holes are a contributing factor to the difficulty of accurately placing data summarizing unstructured grids. At block 710, the surface built at block 704 is populated with aggregated data, included data developed during the hole filling performed at block 708.

The output from the method 700 is a contiguous surface populated with aggregated data from an unstructured grid. Faces on the output surface corresponding to both active and inactive cells in the unstructured grid are identified and a contiguous output surface is created and populated with properties.

Figure 8:
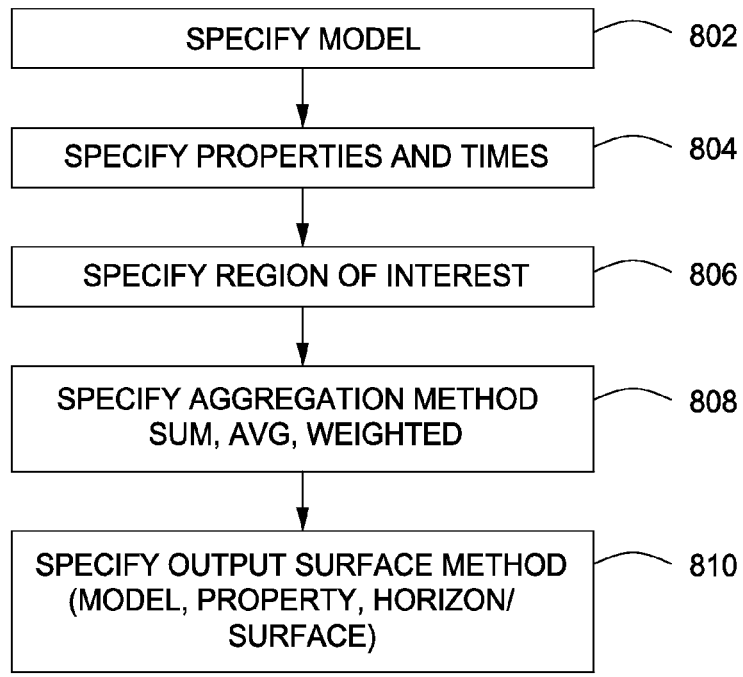
FIG. 8 is a process flow diagram showing an exemplary method for selecting initial information for performing a data analysis according to an exemplary embodiment of the present techniques.

FIG. 8 is a process flow diagram showing an exemplary method for selecting initial information for performing a data analysis according to an exemplary embodiment of the present techniques. The method for selecting initial information is generally referred to by the reference number 800.

At block 802, a user specifies a model to be evaluated. The model may relate to a specific unstructured grid, which may comprise data about one or more properties of interest for a physical region such as an oil and/or natural gas field, for example.

Properties of interest may be specified, as shown at block 804. If properties are time dependent, users may be provided with the ability to select all or a subset of the available times.

At block 806, a specific region of interest is selected. The portion of the model (i.e., unstructured grid) to include in the aggregation may be selected using one of a plurality of available options including the entire model, the cells currently displayed in a 3D viewer, cells possessing a specified property value, or the cells located between two surfaces or horizons, to name just a few examples.

An aggregation method may be specified, as shown at block 808. As explained herein, data may be accumulated along one of a plurality of directions including along columns of cells, vertically, or normal to a surface at a point. In addition, examples of aggregation methods that may be specified include summing, weighted summing, averaging, or weighted averaging, to name just a few examples. Those of ordinary skill in the art will appreciate that a wide range of averaging techniques may be employed. Examples of such averaging techniques include arithmetic averaging, geometric averaging, and harmonic averaging.

An output surface method may be specified, as shown at block 810. Example of output surface methods that may be selected include a model output surface method, a property output surface method or a horizon/surface output surface method, to name just a few examples. Data may be attributed to the top or base of the model, the top or base of a model layer or zone, a geologic model horizon or a specified surface. Moreover, an exemplary embodiment of the present techniques allows proper positioning of data even though constituent cells along the aggregation direction may be inactive.

According to an exemplary embodiment of the present techniques, the correct location on the output surface/map to paint the aggregated properties is determined upon execution of this method. Several options are provided for specifying the output surface for the summary properties, including using one of the following: the top or base of a reservoir model layer, a surface or at the top or base of an arbitrary zone, a geologic model horizon or surface, or a surface external to the unstructured grid. In any of these options, the data is aggregated and stored along lines through the model, including columns, with one aggregated value being stored per line.

If a layer selected for the output surface has inactive cells, the correct placement of the output surface is identified using either an iterative, distance-based, nearest-neighbor algorithm, or a relative position algorithm based on the fractional distance from the top and base. In the nearest neighbor approach, the most appropriate face in a column of faces is identified from its nearest valid neighbors. In the fractional distance algorithm, the fractional distance between the top and base of either the entire model or some subset of the model is used to determine the appropriate face in a column. Appropriateness is determined by the face with the closest centroid z-value in a depth or elevation-based reservoir model for both of these cases. These approaches produce a surface that is populated for every column that has at least one valid property value specified.

Figure 9:
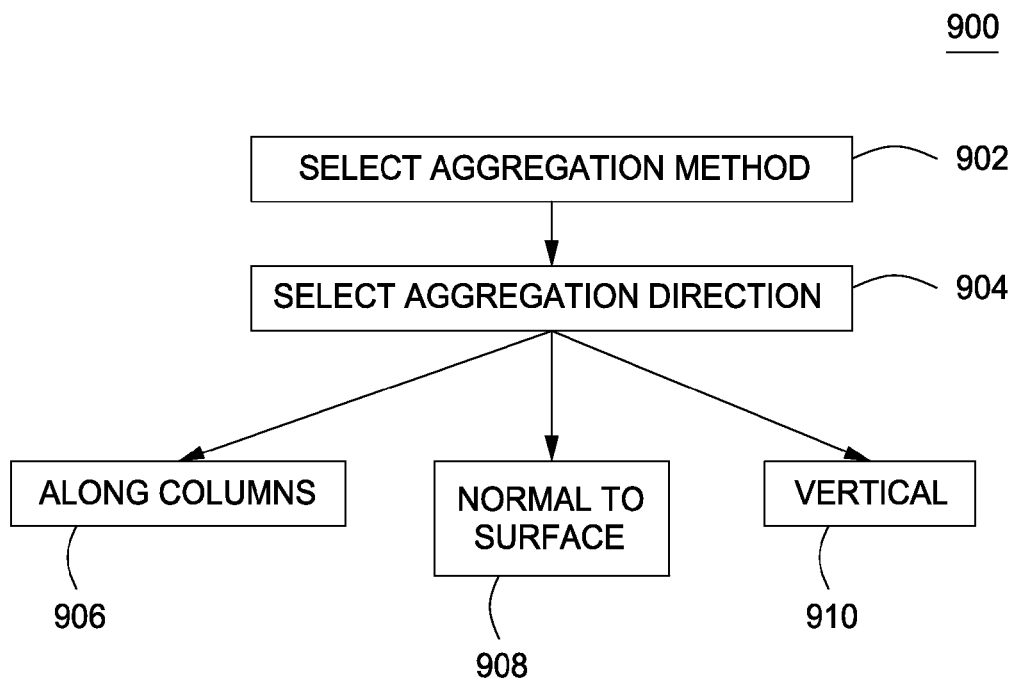
FIG. 9 is a process flow diagram showing an exemplary method for selecting a data aggregation algorithm according to an exemplary embodiment of the present techniques.

FIG. 9 is a process flow diagram showing an exemplary method for selecting a data aggregation algorithm according to an exemplary embodiment of the present techniques. The diagram is generally referred to by the reference number 900. At block 902, an aggregation algorithm or method is selected.

An aggregation direction is selected, as shown at block 904. Aggregation directions that may be selected include along columns (block 906), normal to a surface (block 908) or vertical (block 910), to name just a few examples. In providing summary data from a model represented by an unstructured grid, properties are aggregated in the region of interest according to the specified aggregation and direction. For the case of aggregation along a column (block 906), the selected property is aggregated along all cells of each column. If the user elects to aggregate either normal to a surface (block 908) or vertically (block 910), a set lines may be created whose ends correspond to the appropriate starting and ending points, such as the center point of each output face. Cells may be selected for aggregation if the selected lines pass through the cell. In one exemplary embodiment, cells are eliminated from consideration in subsequent aggregations once they have been used.

For summary purposes, users can elect to use the entire model or a subset of the model based on various filtering capabilities. Exemplary filtering capabilities include (without limitation) zones, layers, fault blocks/segments, property thresholds, distance filters, volume of interest, and/or any integer property.

Figure 10:
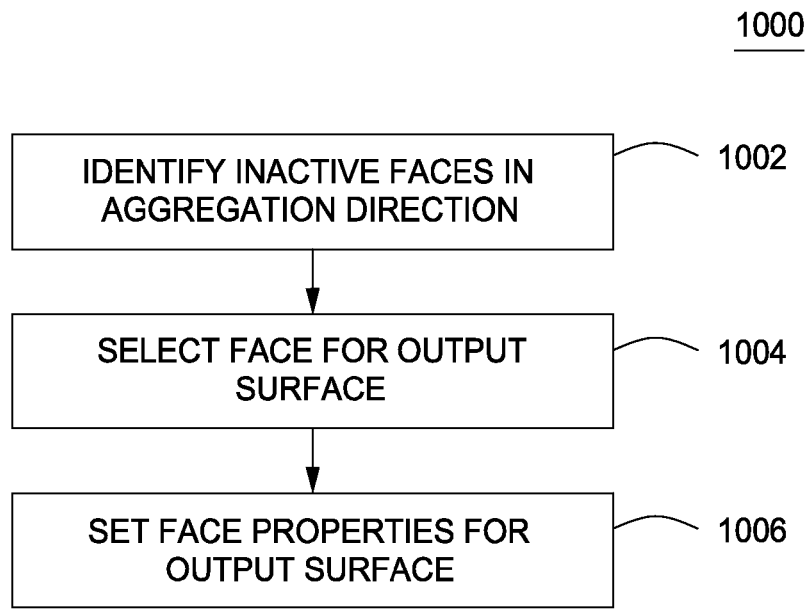
FIG. 10 is a process flow diagram showing an exemplary method for filling data holes according to an exemplary embodiment of the present techniques.

FIG. 10 is a process flow diagram showing an exemplary method for filling data holes according to an exemplary embodiment of the present techniques. As explained herein, filling holes for cells where no data for a property of interest allows the preparation of a meaningful data summary that reflects the geometry of an unstructured grid that is being evaluated. The method of filling data holes is generally referred to by the reference number 1000.

At block 1002, inactive faces are identified in the selected aggregation direction. For example, if the aggregation direction is along columns, cells for which no data exists in the region of interest of the unstructured grid are identified. A face output surface is selected, as shown at block 1006. As described previously, potential methods for selecting the output face include nearest neighbor and fractional distance. Face properties for the selected output surface are set, as shown at block 1008.

For the case of block 906, one method to identify all faces associated with columns is through a polyline/model intersection algorithm that identifies all active and inactive cells intersected by a line passing through cells possessing the same column ID. Alternatively, column IDs of inactive cells could be populated by stepping up and down the grid using the top or base faces of each cell if the data structure is populated in such a way that the top and base faces of an inactive cell are uniquely identified. In either case, the inactive cells are associated with active cells in the same column. For the case of the intersecting line, it may be assumed that the direction of the intersecting line is uniform for all cells within a single column.

If a horizon or surface output method is specified to be the output surface at block 1006, additional steps may be taken to yield a contiguous surface according to the present techniques. Specifically, the intersection of the selected horizon or surface and the unstructured grid results in the union of nodes between the surface and model grids. Nodes are created for each intersection of the surface and model as well. Therefore, the number of faces of the output surface is greater than the number of columns resulting in multiple output surface faces per column. Using face centroids of each output surface face is insufficient to completely populate the intersection surface. Therefore, according to the present techniques, for each face of the output surface that is not populated with a data value using the method described above, a vertical polyline may be used to identify the active cells directly above and below the surface (two intersections). From the column IDs of the intersected cells, the middle or most likely value may be used to populate the face properties. A similar approach can be used for surfaces external to the model. In this manner, an exemplary embodiment provides a contiguous output surface, even though some cells in the region of interest are inactive.

As an additional possible workflow for building the output surface, a user can elect to use a set of external geometric criteria to identify the location of the output faces for the contiguous map. These criteria could represent a property, such as a layer or zone from a separate model, or a closed hull surrounding any 3D volume, such as an iso-surface. The criteria are used to identify all cells within an unstructured grid that are completely within, mostly within, or partially within the boundary defined by the geometric criteria. A contiguous set of faces is selected, using one of the previously defined methods, conforming to the top or base faces of the geometrically identified cells. Since the geometric locations of all cells, faces, and nodes within an unstructured grid are known, the desired faces of both active and inactive cells can be uniquely identified using this method.

Figure 11:
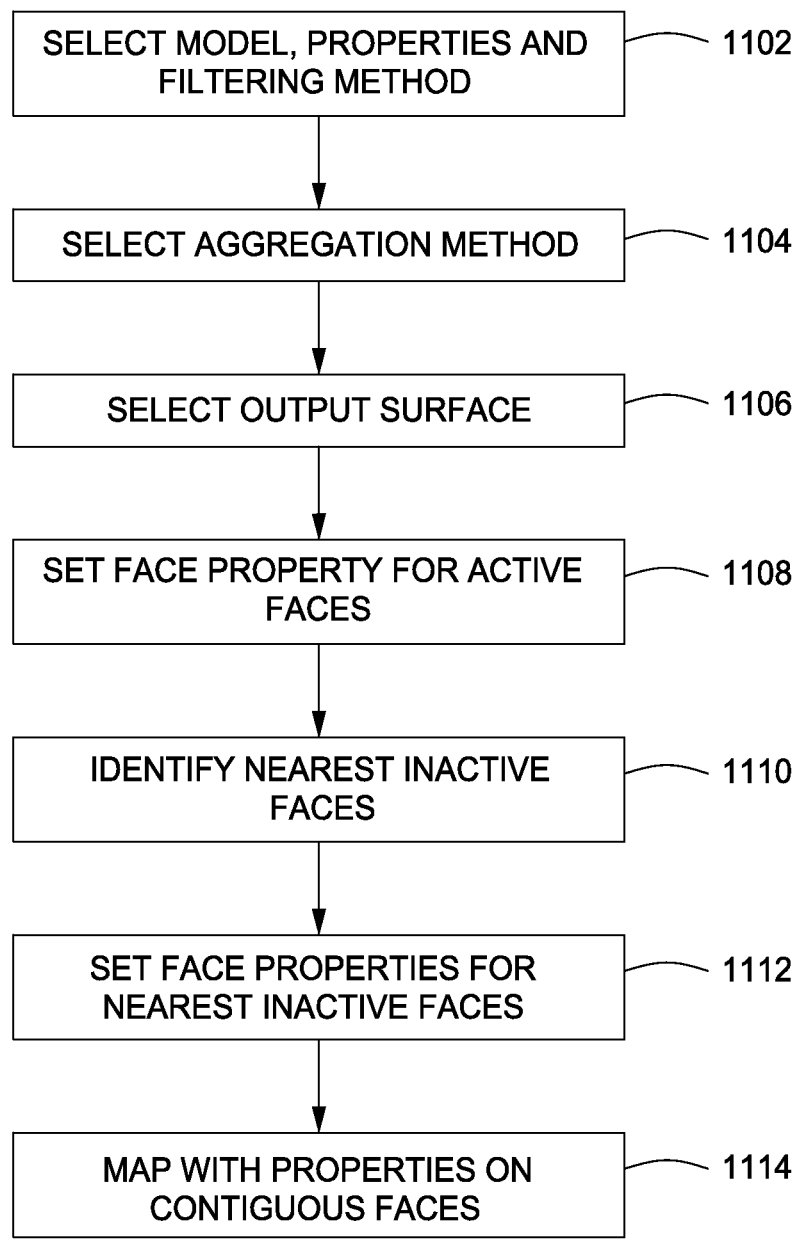
FIG. 11 is a process flow diagram showing a method of creating a contiguous property map on an unstructured grid that contains inactive cells, according to an exemplary embodiment of the present techniques.

FIG. 11 is a process flow diagram showing a method of creating a contiguous property map on an unstructured grid that contains inactive cells, according to an exemplary embodiment of the present techniques. A visualization of the data that comprises the property map may be produced, if desired. The method is generally referred to by the reference number 1100.

In an exemplary embodiment, a user desires to create a contiguous map at the bottom depth of the top layer of cells for a set of aggregated properties. A model represented by an unstructured grid comprises cells that have some data for the aggregated properties, as well as some inactive cells. Moreover, the unstructured grid 102 shown in FIG. 1 is illustrative of a model that comprises four layers of cells. The model has an inactive region comparable to the inactive region 204 in FIG. 2. The inactive region contains inactive cells located in the first and second layers of the unstructured grid. The method 1100 may be used for creating an aggregate property map for a model possessing inactive cells at the desired map location. By way of example, the location for the map is at a depth located at the bottom of the first layer.

At block 1102, a specific model (unstructured grid), properties of interest and a filtering method are selected. To facilitate the specific selections, the user may be presented with a dialog box on a computer screen or other display to select the required data from which to generate the desired map. An aggregation method is selected, as shown at block 1104. Once the required inputs have been specified, the aggregates of the selected properties for the requested region are computed using the requested aggregation method.

An output surface is selected, as shown at block 1106. At block 1108, a face property is set for active faces. The resulting values are stored on the faces of the output surface corresponding to the top or base faces of the active model cells. According to an exemplary embodiment of the present techniques, this is a precursor to filling data holes for inactive cells.

The nearest inactive faces are then identified, as indicated at block 1110. Face properties may then be set for the nearest inactive faces, as shown at block 1112. At block 1114, a property map having properties on contiguous faces is produced. For the inactive cells, the inactive faces are filled according to a hole filling method described herein. In so doing, data holes are filled, as described herein, so that data is shown in the correct location for all faces represented in the region of interest in the unstructured grid.

Figure 12:
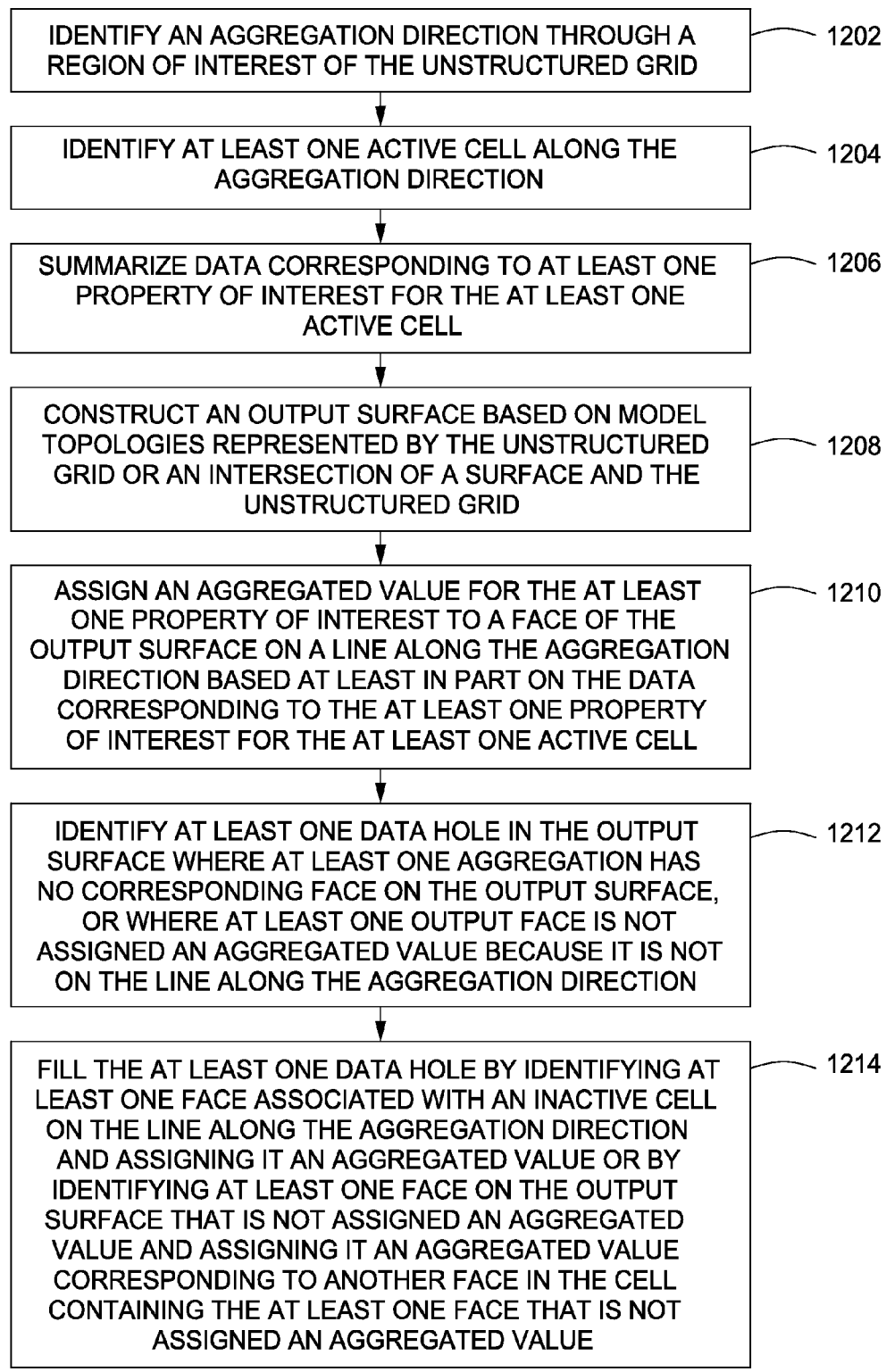
FIG. 12 is a process flow diagram showing a method for summarizing data corresponding to a property of interest on an unstructured grid according to exemplary embodiments of the present techniques.

FIG. 12 is a process flow diagram showing a method for summarizing data corresponding to a property of interest on an unstructured grid according to exemplary embodiments of the present techniques. The unstructured grid comprises a plurality of active cells and a plurality of inactive cells. The process is generally referred to by the reference number 1200. The process 1200 may be executed using one or more computer components of the type described below with reference to FIG. 14. Such computer components may comprise one or more tangible, computer-readable medium that stores computer-executable instructions.

At block 1202, the process begins when an aggregation direction through a region of interest of the unstructured grid is identified. An active cell along the aggregation direction is identified, as shown at block 1204. Data corresponding to the property of interest for the active cell is summarized, as shown at block 1206. Moreover, the data may be aggregated according to an aggregation algorithm, as explained herein.

At block 1208, an output surface is constructed based on model topologies represented by the unstructured grid or an intersection of a surface and the unstructured grid. The output surface is used to display values corresponding to the property of interest from the unstructured grid. An aggregated value, determined according to the selected aggregation algorithm, is assigned for the property of interest to a face of the output surface on a line along the aggregation direction based at least in part on the data corresponding to the at least one property of interest for the at least one active cell, as shown at block 1210.

The method 1200 continues at block 1212 with the identification of a data hole in the output surface. A data hole may occur where at least one aggregation has no corresponding face on the output surface (an inactive cell). A data hole may also occur if at least one output face is not assigned an aggregated value because it is not on the line along the aggregation direction. This condition may occur where a surface has been intersected with the unstructured grid for the purpose of defining an area of the unstructured grid for which a user desires to evaluate the property of interest, and an active cell is intersected on multiple faces by the surface that intersects the unstructured grid.

At block 1214, the data hole is filled by one of two methods. A hole resulting from an inactive cell is filled by identifying at least one face associated with an inactive cell on the line along the aggregation direction and assigning it an aggregated value. In the case in which multiple faces on the output surface are created by the intersection of a surface that defines an area of interest and the unstructured grid, the data hole may be filled by identifying a face on the output surface that is not assigned an aggregated value and assigning it an aggregated value corresponding to another face in the intersected cell. In other words, the data hole arising when multiple faces on an output surface contained within a cell that is intersected by the line in the aggregation direction may be filled by a value corresponding to one of the faces of the intersected cell.

Figure 13:
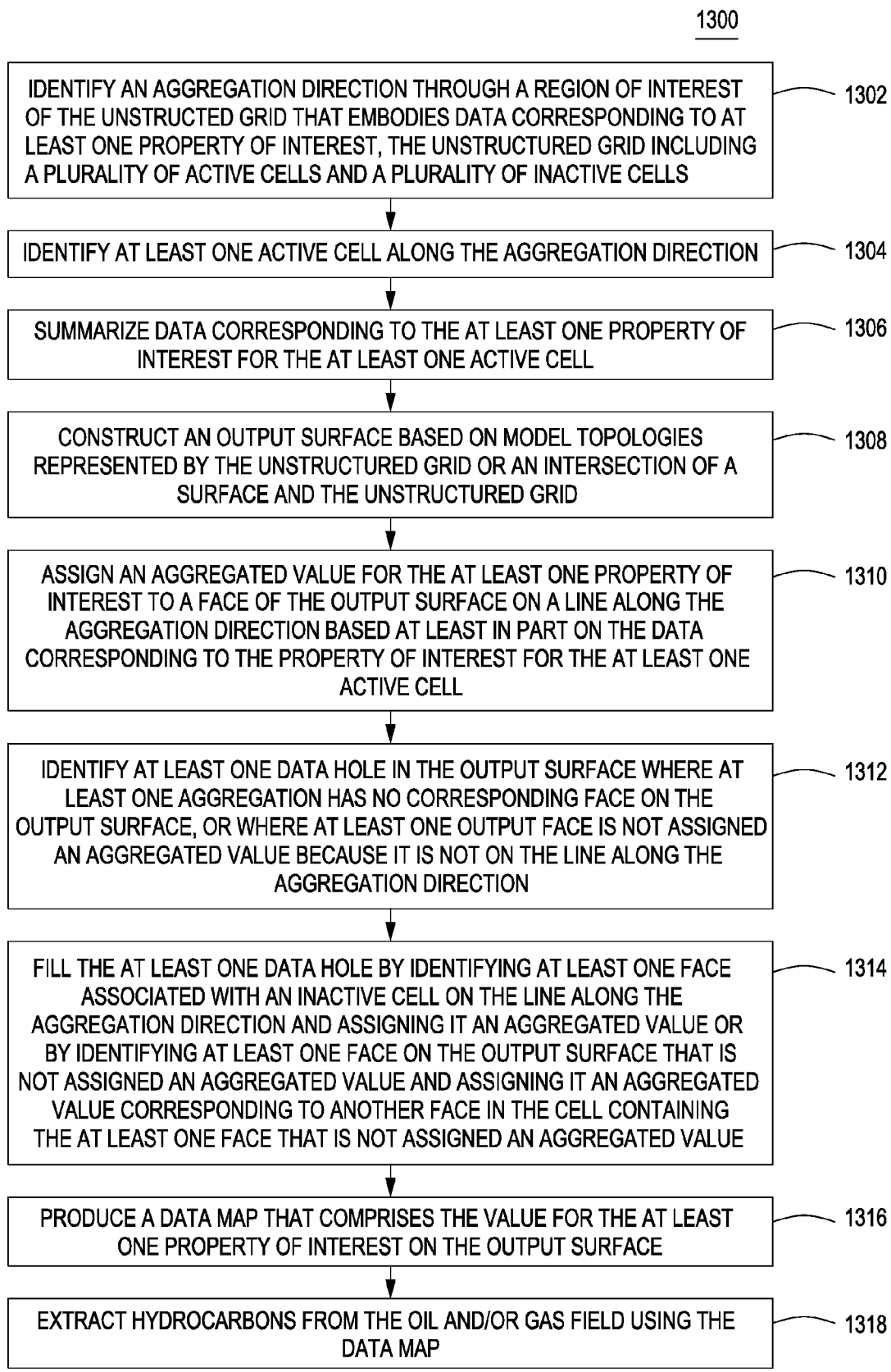
FIG. 13 is a process flow diagram showing a method for producing hydrocarbons from an oil and/or gas field according to exemplary embodiments of the present techniques.

FIG. 13 is a process flow diagram showing a method for producing hydrocarbons from an oil and/or gas field according to exemplary embodiments of the present techniques. The process is generally referred to by the reference number 1300. The process 1300 employs exemplary embodiments set forth herein for summarizing data corresponding to a property of interest on an unstructured grid. As explained herein, the unstructured grid embodies data corresponding to the property of interest. The unstructured grid includes a plurality of active cells include data representative of the property of interest and a plurality of inactive cells that do not include any data regarding the property of interest.

Those of ordinary skill in the art will appreciate that a visualization engine according to the present techniques may facilitate the production of hydrocarbons by producing data models and/or visualizations that allow geologists, engineers and the like to determine a course of action to take to enhance hydrocarbon production from a subsurface region. By way of example, a 3D or 4D visualization produced according to an exemplary embodiment of the present techniques may allow an engineer or geologist to determine well properties in case of a fracture near a wellbore. The visualization and underlying physical property model data may be used to increase production of hydrocarbons from a subsurface region.

At block 1302, the method begins when an aggregation direction through a region of interest of the unstructured grid is identified. An active cell along the aggregation direction is identified, as shown at block 1304. Data corresponding to the property of interest for the active cell is summarized, as shown at block 1306. Moreover, the data may be aggregated according to an aggregation algorithm, as explained herein.

An output surface is constructed based on model topologies represented by the unstructured grid or an intersection of a surface and the unstructured grid, as shown at block 1308. At block 1310, an aggregated value for the at least one property of interest is assigned to a face of the output surface on a line along the aggregation direction based at least in part on the data corresponding to the property of interest for the at least one active cell.

As shown at block 1312, a data hole in the output surface may be identified where at least one aggregation has no corresponding face on the output surface. Alternatively, a data hole may occur where at least one output face is not assigned an aggregated value because it is not on the line along the aggregation direction.

The data hole is filled, as indicated at block 1314. In the case of a data hole caused by an inactive cell, the data hole is filled by identifying at least one face associated with an inactive cell on the line along the aggregation direction and assigning it an aggregated value. If the data hole occurs because no aggregate value is assigned, the hole may be filled by assigning the face having no aggregated value an aggregated value corresponding to another face in the cell.

At block 1316, a data map that comprises the values for the at least one property of interest on the output surface is produced. At block 1318, hydrocarbons are extracted from the oil and/or gas field using the data map.

Figure 14:
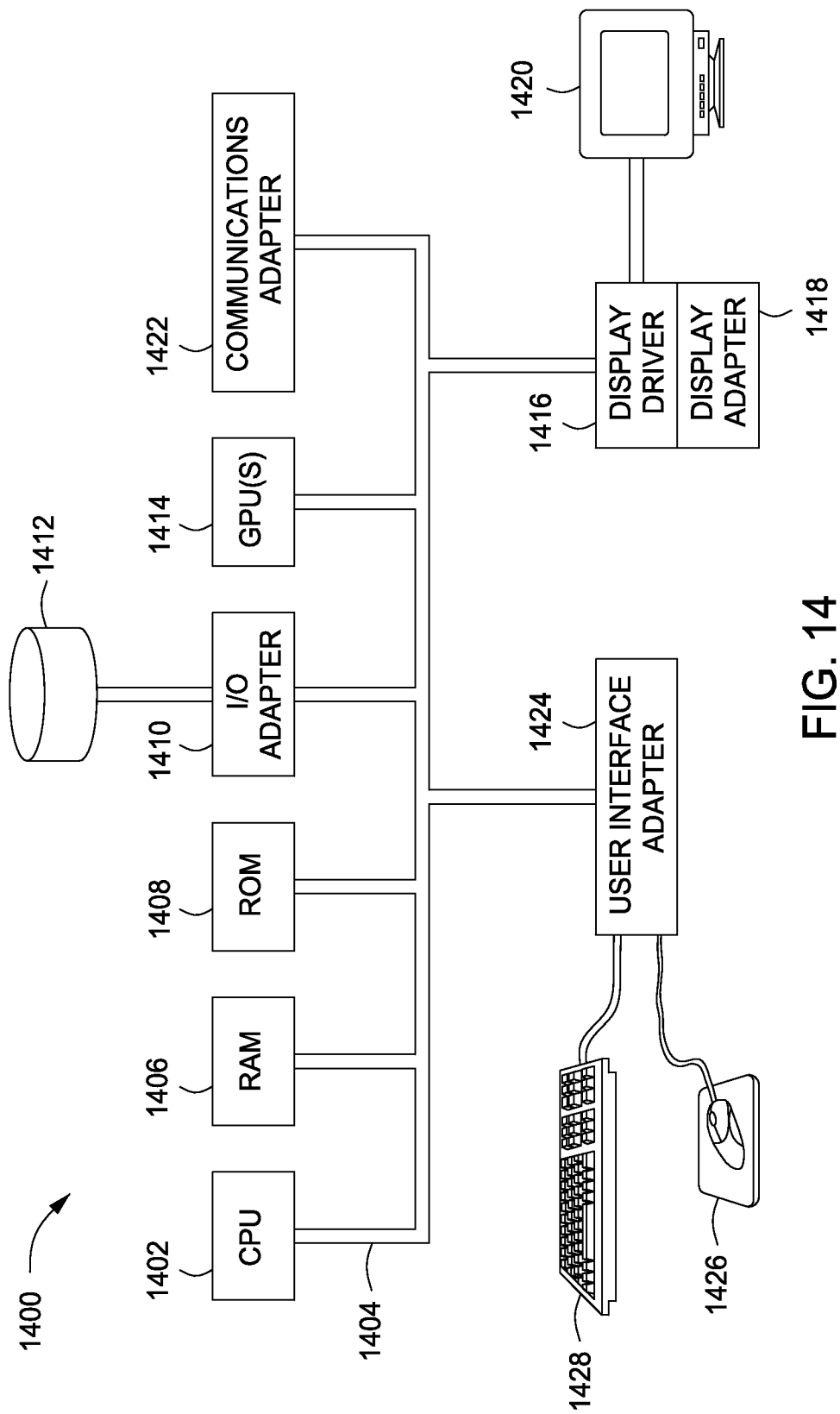
FIG. 14 is a block diagram of a computer system that may be used to perform a method for summarizing data corresponding to a property of interest according to exemplary embodiments of the present techniques.

FIG. 14 is a block diagram of a computer system that may be used to perform a method for summarizing data corresponding to a property of interest on an unstructured grid according to exemplary embodiments of the present techniques. The computer system is generally referred to by the reference number 1400. A central processing unit (CPU) 1402 is coupled to system bus 1404. The CPU 1402 may be any general-purpose CPU, although other types of architectures of CPU 1402 (or other components of exemplary system 1400) may be used as long as CPU 1402 (and other components of system 1400) supports the inventive operations as described herein. Those of ordinary skill in the art will appreciate that, while only a single CPU 1402 is shown in FIG. 14, additional CPUs may be present. Moreover, the computer system 1400 may comprise a networked, multi-processor computer system. The CPU 1402 may execute the various logical instructions according to various exemplary embodiments. For example, the CPU 1402 may execute machine-level instructions for performing processing according to the operational flow described above in conjunction with FIG. 12 or FIG. 13.

The computer system 1400 may also include computer components such as computer-readable media. Examples of computer-readable media include a random access memory (RAM) 1406, which may be SRAM, DRAM, SDRAM, or the like. The computer system 1400 may also include additional computer-readable media such as a read-only memory (ROM) 1408, which may be PROM, EPROM, EEPROM, or the like. RAM 1406 and ROM 1408 hold user and system data and programs, as is known in the art. The computer system 1400 may also include an input/output (I/O) adapter 1410, a communications adapter 1422, a user interface adapter 1424, and a display adapter 1418. In an exemplary embodiment of the present techniques, the display adapted 1418 may be adapted to provide a 3D representation of a 3D earth model. Moreover, an exemplary embodiment of the display adapter 1418 may comprise a visualization engine that is adapted to provide a visualization of extracted data. The I/O adapter 1410, the user interface adapter 1424, and/or communications adapter 1422 may, in certain embodiments, enable a user to interact with computer system 1400 in order to input information.

The I/O adapter 1410 preferably connects a storage device(s) 1412, such as one or more of hard drive, compact disc (CD) drive, floppy disk drive, tape drive, etc. to computer system 1400. The storage device(s) may be used when RAM 1406 is insufficient for the memory requirements associated with storing data for operations of embodiments of the present techniques. The data storage of the computer system 1400 may be used for storing information and/or other data used or generated as disclosed herein.

The computer system 1400 may comprise one or more graphics processing units (GPU(s)) 1414 to perform graphics processing. Moreover, the GPU(s) 1414 may be adapted to provide a visualization useful in performing a well planning process according to the present techniques. The GPU(s) 1414 may communicate via a display driver 1416 with a display adapter 1418. The display adapter 1418 may produce a visualization on a display device 1420. Moreover, the display device 1420 may be used to display information or a representation pertaining to a portion of a subsurface region under analysis, such as displaying a generated well path, according to certain exemplary embodiments.

A user interface adapter 1424 may be used to couple user input devices. For example, the user interface adapter 1424 may connect devices such as a pointing device 1426, a keyboard 1428, and/or output devices to the computer system 1400.

The architecture of system 1400 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

An exemplary embodiment of the present techniques facilitates the creation of many maps summarizing multiple zones and properties in a single execution. Furthermore, an exemplary embodiment provides the capability for the user to compare the maps generated from an unstructured grid to that generated from a separate structured or unstructured model. Properties are transferred between the two maps using one of a plurality of methods including nearest neighbor or area containment lookup algorithms prior to analysis. Potential analysis tasks include differencing or ratios of the mapped properties from the different models. Additionally, a separate, but related tool provides for the resulting output of the model zone summarization to be a table of values.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method for summarizing data corresponding to at least one property of interest on an unstructured grid that includes a plurality of active cells and a plurality of inactive cells on an output surface, the method comprising:
   identifying an aggregation direction through a region of interest of the unstructured grid;
   identifying at least one active cell along the aggregation direction;
   summarizing data corresponding to the at least one property of interest for the at least one active cell;
   constructing, using a computer system, an output surface based on model topologies represented by the unstructured grid or an intersection of a surface and the unstructured grid;
   assigning, using the computer system, an aggregated value for the at least one property of interest to a face of the output surface on a line along the aggregation direction based at least in part on the data corresponding to the at least one property of interest for the at least one active cell;
   identifying at least one data hole in the output surface where at least one aggregation has no corresponding face on the output surface, or where at least one output face is not assigned an aggregated value because it is not on the line along the aggregation direction; and
   filling, using the computer system, the at least one data hole by identifying at least one face associated with an inactive cell on the line along the aggregation direction and assigning it an aggregated value or by identifying at least one face on the output surface that is not assigned an aggregated value and assigning it an aggregated value corresponding to another face in the cell containing the at least one face that is not assigned an aggregated value.

2. The method recited in claim 1, comprising providing a visualization of values for the property of interest on the output surface.

3. The method recited in claim 1, wherein the output surface comprises a contiguous map of the property of interest on the unstructured grid.

4. The method recited in claim 1, wherein an inactive face in the aggregation direction is a nearest neighbor to any face previously populated on the output surface.

5. The method recited in claim 1, wherein the inactive face is at the same relative distance between two topological layers as the at least one active face along neighboring aggregations.

6. The method recited in claim 1, comprising selecting an output surface face that intersects the unstructured grid along the aggregation direction.

7. The method recited in claim 6, comprising creating nodes for each intersection of the output surface face and the unstructured grid.

8. The method recited in claim 1, wherein identifying the at least one inactive cell comprises providing a line between two active cells along the aggregation direction and identifying whether the at least one inactive cell is intersected by the line.

9. The method recited in claim 1, wherein the aggregation direction comprises along columns, normal to a surface or vertical.

10. The method recited in claim 1, comprising selecting an aggregation method to apply to data corresponding to the property of interest, the aggregation method comprising summing data values for cells along the aggregation direction or averaging data values for cells along the aggregation direction.

11. The method recited in claim 10, wherein the summation or averaging methods are weighted by a property.

12. The method recited in claim 1, comprising selecting at least one external geometric criterion to identify locations of output faces on the output surface.

13. The method recited in claim 1, wherein a map created is compared with another map by difference or ratio.

14. A computer system that is adapted to summarize data corresponding to a property of interest on an unstructured grid that includes a plurality of active cells and a plurality of inactive cells, the computer system comprising:
  a processor; and
  a non-transitory, computer-readable storage medium that stores computer-readable instructions for execution by the processor, the computer-readable instructions comprising:
    code that, when executed by the processor, is adapted to cause the processor to identify an aggregation direction through a region of interest of the unstructured grid;
    code that, when executed by the processor, is adapted to cause the processor to identify at least one active cell along the aggregation direction;
    code that, when executed by the processor, is adapted to cause the processor to summarize data corresponding to at least one property of interest for the at least one active cell;
    code that, when executed by the processor, is adapted to cause the processor to construct an output surface based on model topologies represented by the unstructured grid or an intersection of a surface and the unstructured grid;
    code that, when executed by the processor, is adapted to cause the processor to assign an aggregated value for the at least one property of interest to a face of the output surface on a line along the aggregation direction based at least in part on the data corresponding to the at least one property of interest for the at least one active cell;
    code that, when executed by the processor, is adapted to cause the processor to identify at least one data hole in the output surface where at least one aggregation has no corresponding face on the output surface, or where at least one output face is not assigned an aggregated value because it is not on the line along the aggregation direction; and
    code that, when executed by the processor, is adapted to cause the processor to fill the at least one data hole by identifying at least one face associated with an inactive cell on the line along the aggregation direction and assigning it an aggregated value or by identifying at least one face on the output surface that is not assigned an aggregated value and assigning it an aggregated value corresponding to another face in the cell containing the at least one face that is not assigned an aggregated value.

15. The computer system recited in claim 14, wherein the computer-readable instructions comprise code that, when executed by the processor, is adapted to cause the processor to provide a visualization of values for the property of interest for the output surface.

16. The computer system recited in claim 14, wherein the output surface comprises a contiguous map of the property of interest on the unstructured grid.

17. The computer system recited in claim 14, wherein the inactive cell is a nearest neighbor of the at least one active cell along the aggregation direction.

18. The computer system recited in claim 14, wherein the inactive cell is at the same relative distance between two topological layers as the at least one active face along neighboring aggregations.

19. The computer system recited in claim 14, wherein the computer-readable instructions comprise code that, when executed by the processor, is adapted to cause the processor to select an output surface face that intersects the unstructured grid along the aggregation direction.

20. A method for producing hydrocarbons from an oil and/or gas field using data corresponding to a property of interest of the oil and/or gas field, the method comprising:
  identifying an aggregation direction through a region of interest of an unstructured grid that embodies data corresponding to at least one property of interest, the unstructured grid including a plurality of active cells and a plurality of inactive cells;
  identifying at least one active cell along the aggregation direction;
  summarizing data corresponding to the at least one property of interest for the at least one active cell;
  constructing an output surface based on model topologies represented by the unstructured grid or an intersection of a surface and the unstructured grid;
  assigning an aggregated value for the at least one property of interest to a face of the output surface on a line along the aggregation direction based at least in part on the data corresponding to the property of interest for the at least one active cell;

identifying at least one data hole in the output surface where at least one aggregation has no corresponding face on the output surface, or where at least one output face is not assigned an aggregated value because it is not on the line along the aggregation direction;

filling the at least one data hole by identifying at least one face associated with an inactive cell on the line along the aggregation direction and assigning it an aggregated value or by identifying at least one face on the output surface that is not assigned an aggregated value and assigning it an aggregated value corresponding to another face in the cell containing the at least one face that is not assigned an aggregated value;

producing a data map that comprises the values for the at least one property of interest on the output surface; and extracting hydrocarbons from the oil and/or gas field using the data map.

* * * * *